(12) United States Patent
Buldrini et al.

(10) Patent No.: US 11,905,936 B2
(45) Date of Patent: Feb. 20, 2024

(54) ION THRUSTER FOR THRUST VECTORED PROPULSION OF A SPACECRAFT

(71) Applicant: ENPULSION GmbH, Wiener Neustadt (AT)

(72) Inventors: Nembo Buldrini, Pottendorf (AT); Bernhard Seifert, Vienna (AT); Alexander Reissner, Vienna (AT)

(73) Assignee: Enpulsion GmbH, Wiener Neustadt (AT)

( * ) Notice: Subject to any disclaimer, the term of this patent is extended or adjusted under 35 U.S.C. 154(b) by 403 days.

(21) Appl. No.: 17/264,893

(22) PCT Filed: May 17, 2019

(86) PCT No.: PCT/EP2019/062807
§ 371 (c)(1),
(2) Date: Feb. 1, 2021

(87) PCT Pub. No.: WO2020/025183
PCT Pub. Date: Feb. 6, 2020

(65) Prior Publication Data
US 2021/0300599 A1    Sep. 30, 2021

(30) Foreign Application Priority Data
Aug. 2, 2018    (EP) ..................... 18187104

(51) Int. Cl.
*F03H 1/00*    (2006.01)
*B64G 1/40*    (2006.01)
(52) U.S. Cl.
CPC ............. *F03H 1/005* (2013.01); *B64G 1/402* (2013.01); *B64G 1/405* (2013.01); *F03H 1/0037* (2013.01)

(58) Field of Classification Search
CPC ....... F03H 1/0037; F03H 1/005; B64G 1/405; B64G 1/402
See application file for complete search history.

(56) References Cited

U.S. PATENT DOCUMENTS 5,734,223 A * 3/1998 Makishima ............. H01J 3/022
313/496
7,827,779 B1 * 11/2010 Krishnan ............... F03H 1/0012
313/361.1

(Continued)

FOREIGN PATENT DOCUMENTS

| | | |
|---|---|---|
| CA | 3071022 A1 | 2/2019 |
| JP | S 59-44754 A | 3/1984 |
| WO | 2019025174 A1 | 2/2019 |

OTHER PUBLICATIONS

Vasiljevich, Ivanhoe et al.; "Development of an Indium mN-FEEP Thruster" 44th AIAA/ASME/SAE/ASEE Joint Propulsion Conference & Exhibit, 2008.*

(Continued)

*Primary Examiner* — Tye William Abell
(74) *Attorney, Agent, or Firm* — Hoffmann & Baron, LLP

(57) ABSTRACT

The disclosed subject matter relates to an ion thruster for thrust vectored propulsion of a spacecraft, comprising a reservoir for a propellant, an emitter having a base and, on one side of the base, at least one outlet for emitting ions of the propellant, wherein the base is connected to the reservoir for providing flow of propellant from the reservoir to said at least one outlet, and an extractor facing said one side of the emitter for extracting and accelerating the ions from the emitter, wherein the extractor is split into sectors about an axis which orthogonally runs through said one side of the emitter, wherein said sectors are electrically insulated from one another.

14 Claims, 2 Drawing Sheets

(56) References Cited

U.S. PATENT DOCUMENTS 9,194,379 B1* 11/2015 Biblarz .................... F03H 1/00
2012/0144796 A1* 6/2012 Marrese-Reading ........................
F03H 1/0012
205/205

OTHER PUBLICATIONS

Office Action in the corresponding Indian Patent Application 202117005662 dated Aug. 12, 2022.
"Final Report for Colloid Thruster Technology, Contract No. NAS 5-21025," prepared by Electro-Optical Systems for Goddard Space Flight Center (Sep. 1971).
Vasijevich, Ivanhoe, et al. "Development of an Indium mN-FEEP Thruster." 44th AIAA/ASME/SAE/ASEE Joint Propulsion Conference & Exhibit. 2008.
European Patent Office Search Report on Application No. 18187104.7-1203, dated Jan. 17, 2019.
PCT International Search Report on International Application No. PCT/EP2019/062807 dated Aug. 26, 2019.
Notice of First Examination Opinion issued in Japanese Application No. 201980051270.6 dated Nov. 10, 2023 and English translation.

* cited by examiner

ION THRUSTER FOR THRUST VECTORED PROPULSION OF A SPACECRAFT

CROSS-REFERENCE TO RELATED APPLICATIONS

This application is a National Phase application of International Application No. PCT/EP2019/062807 filed May 17, 2019 which claims priority to European Patent Application No. 18187104.7 filed Aug. 2, 2018, the disclosures of which are incorporated herein by reference.

TECHNICAL FIELD

The disclosed subject matter relates to an ion thruster for thrust vectored propulsion of a spacecraft. More specifically, the subject matter relates to an ion thruster which comprises a reservoir for a propellant, an emitter having a base and, on one side of the base, at least one outlet for emitting ions of the propellant, wherein the base is connected to the reservoir for providing flow of propellant from the reservoir to said at least one outlet, and an extractor facing said one side of the emitter for extracting and accelerating the ions from the emitter.

BACKGROUND

Ion thrusters create thrust by electrically accelerating ions as propellant; such ions can be generated, e.g., from neutral gas (usually xenon) ionized by extracting electrons out of the atoms, from a liquid metal, or from an ionic liquid. Field-emission electric propulsion (FEEP) systems are based on field ionization of a liquid metal (usually either caesium, indium, gallium or mercury). Colloid ion thrusters, also known as electrospray thrusters, use ionic liquid (usually room temperature molten salts) as propellant.

The emitter outlets of FEEP or colloid/electrospray ion thrusters are usually projections with the shape of cones, pyramids, triangular prisms, or the like. To achieve a strong electric field for ion extraction, the projections may be sharp-tipped or sharp-edged to utilize the field-concentrating effect of the tip or edge. In other ion thrusters such as Kaufman-type thrusters, the emitter outlets may just be one or more channels in the base followed by ionisation electrodes or grids. The ions extracted and accelerated by the extractor facing the emitter generate the thrust for propulsion of the spacecraft. The thrust can be controlled accurately by the strength of the electric field between the emitter and the extractor.

Due to the nature and composition of ion thrusters the direction and orientation of the ions extracted from the emitter may vary temporally or deviate permanently from an intended thrust vector. In order to compensate for such unintended irregularities and/or to increase efficiency of the spacecraft propulsion by optimizing the thrust vector, thrust vectoring, i.e. intentionally controlling the thrust vector of the ion thruster, has been introduced.

One type of thrust vectoring, described, e.g., in U.S. Pat. No. 6,637,701 or 6,032,904, is by gimbal-mounting the ion thruster to the spacecraft and controlling the orientation of the gimbal. However, such a gimbal drive does not only add weight to the spacecraft but, above all, is prone to mechanical malfunction, which is barely acceptable as the reliable functioning of the ion thruster is mission-critical to the spacecraft.

An alternative type of thrust vectoring was introduced for plasma thrusters. Plasma thrusters have annular plasma channels into each of which ionisable gas is injected through nozzles and is ionized therein by mutually crossed electric and magnetic fields; the ions are accelerated by the electric field while the electrons are withheld by the magnetic field due to their lower mass. In U.S. Pat. No. 6,279,314 it is suggested to mount two or more mutually inclined annular plasma channels to a platform and control the thrust vector by individually throttling the flow rate of ionisable gas through the nozzles into each of the plasma channels.

A similar solution was proposed for Kaufman-type and Hall effect thrusters in U.S. Pat. No. 9,494,142, where the annular ionisation channel itself is inclined outwardly such that the ions are emitted by the channel in the direction of an envelope of a cone. Moreover, the ionisation channel is divided into several separate chambers by radial walls; hence, each chamber emits the ions into a different section of the cone. By individually throttling the flow rate of propellant into each of the chambers torque vectoring can be achieved.

However, these types of thrust vectoring suffer from the fact that throttling the inflow of propellant into the chambers is inefficient and, when overdone, leads to a sudden collapse of the ionization in the respective channel or chamber and, thus, to uncontrollable thrust vectoring. Moreover, the valves used for throttling are an additional source of defect to the thrusters, specifically when mechanical valves are used. Furthermore, the inclination of the plasma channels permanently impairs the mass efficiency of both aforementioned systems.

BRIEF SUMMARY

It is thus an object of the present invention to provide an ion thruster which facilitates efficient and reliable thrust vectoring.

This object is achieved with an ion thruster comprising a reservoir for a propellant, an emitter having a base and, on one side of the base, at least one outlet for emitting ions of the propellant, wherein the base is connected to the reservoir for providing flow of propellant from the reservoir to said at least one outlet, and an extractor facing said one side of the emitter for extracting and accelerating the ions from the emitter, which extractor is split into sectors about an axis which orthogonally runs through said one side of the emitter, wherein said sectors are electrically insulated from one another.

Hence, by controlling a supply voltage of each sector separately the strength of the electric field between the emitter and the respective sector of the extractor can be varied independently. When generating electric fields of different strengths the generated thrust differs from sector to sector resulting in thrust vectoring that can be precisely controlled. Nevertheless, the emitter and the extractor form a common acceleration chamber with all emitter outlets therein; no inefficient throttling of the propellant flow to the chamber is necessary and, hence, there is no risk of a sudden collapse of ionisation. Moreover, the mass efficiency of the ion thruster is not impaired as no permanent deflection of ions or inclination of different ion thruster channels is necessary, but the ions are extracted and accelerated in the direction of the respectively intended thrust vector. Furthermore, there are no mechanically moving parts involved at all which substantially enhances the reliability of the ion thruster.

While the number of sectors can be chosen arbitrarily, starting from just two sectors which suffice to enable single-axis thrust vectoring, it is advantageous when the extractor is split into three sectors about said axis. Thereby, full two-axis thrust vectoring is possible, while the number of electric fields to be separately controlled is minimum.

Optionally two or more outlets are arranged symmetrically on said one side of the emitter. In an advantageous embodiment, the two or more outlets are arranged in a circular symmetry about said axis and all sectors span an equal angle about said axis. Hence, the control of the electric field has the same effect on thrust vectoring for each sector as there is the same number of outlets related to each sector.

In a variant thereof, the emitter has a multitude of outlets arranged in a single circle on the base about said axis. Thereby, a single circular window in the extractor can be provided to generate the respective electric fields for the outlets, i.e., the extractor is a sectored ring about said axis in the center. This is easier in manufacturing and alignment with the outlets than providing a separate window in the extractor for each outlet for penetration by the ions extracted from this outlet.

While the outlets may just be openings of channels in the emitter base, for FEEP or colloid ion thrusters the outlets are optionally projections on said emitter base side, e.g., sharp-edged triangular prisms or sharp-tipped pyramids. In an advantageous embodiment the projections are needle-shaped, i.e. narrow, pointed cones. This shape effectuates a sharp tip as desirable and the circular cross section of the needles facilitates a homogenous flow of propellant.

The emitter can, e.g., be made of a material impermeable to the propellant, the surface of which is wettable by the propellant, such that the propellant flow is provided by the wetting effect of the respective surfaces of the base and the projections. Alternatively, the projections are nozzle-type, i.e., penetrated by capillary channels used for propellant flow due to capillary forces. In a favorable embodiment, however, the emitter is made of a porous material which is wetting in respect to the propellant. Such porous emitters and their porous projections transport high volume of propellant both inside and on their outer surfaces and allow for sharp tips or edges. Porous projections offer both high specific impulse, i.e. thrust per propellant mass, and robustness against contamination. Moreover, the thrust can be precisely controlled.

BRIEF DESCRIPTION OF THE DRAWINGS

The disclosed subject matter shall now be explained in more detail below on the basis of exemplary embodiments thereof with reference to the accompanying drawings, in which.

DETAILED DESCRIPTION

Figure 1A:
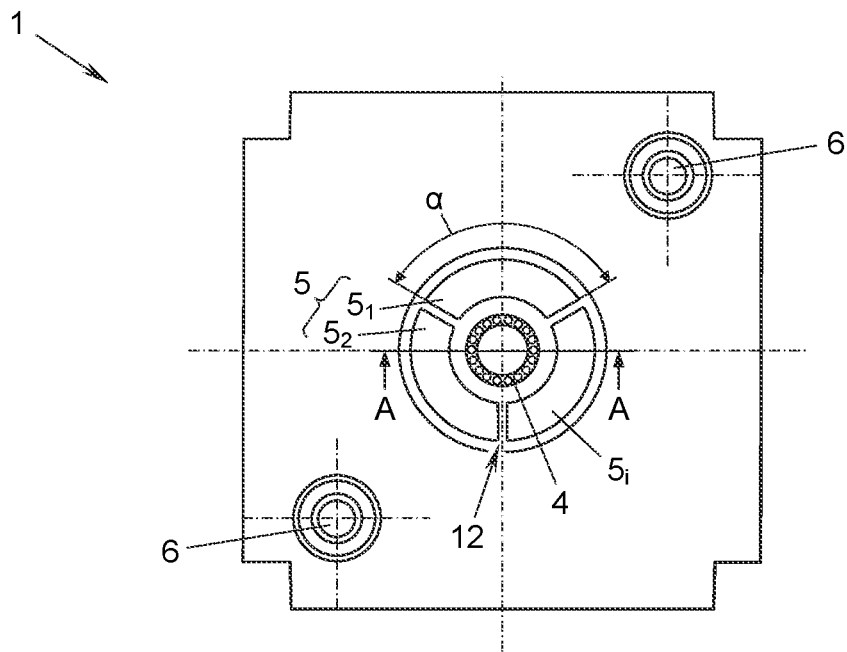
FIGS. 1a and 1b show a first embodiment of the ion thruster according to the disclosed subject matter in a top view (FIG. 1a) and in a detail of a longitudinal section along line A-A of FIG. 1a (FIG. 1b), respectively.
Figure 1B:
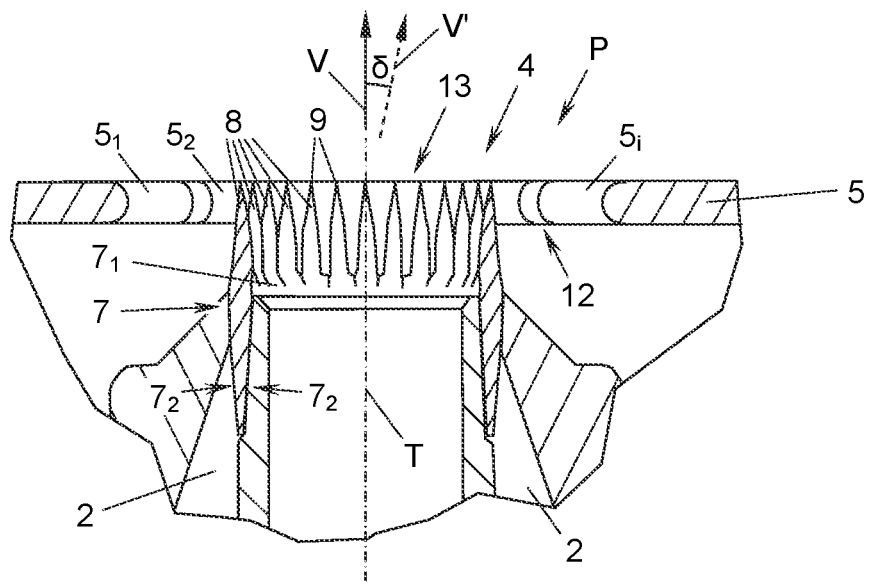
Figure 2A:
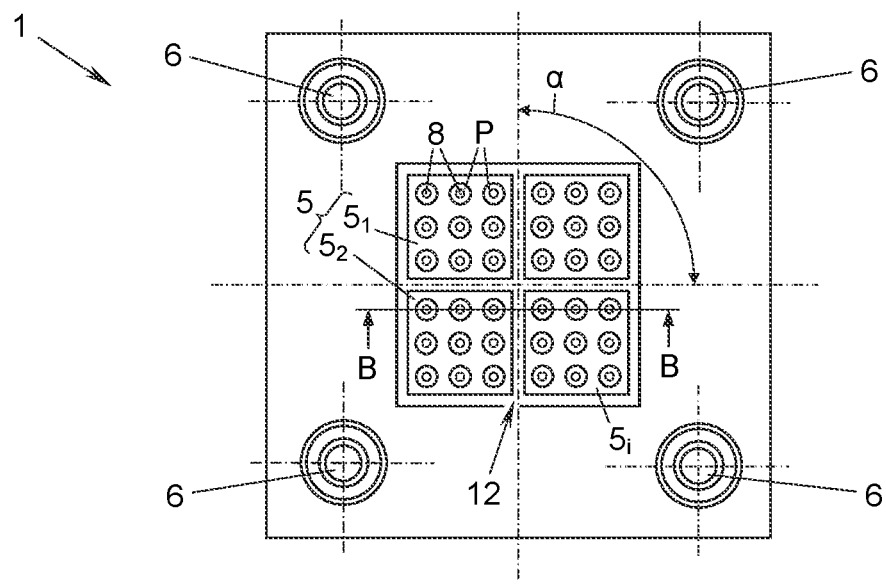
FIGS. 2a to 2c show a second embodiment of the ion thruster according to the disclosed subject matter in a top view (FIG. 2a), in a detail of a longitudinal section along line B-B of FIG. 2a (FIG. 2b), and in a detail C of FIG. 2b (FIG. 2c), respectively.
Figure 2B:
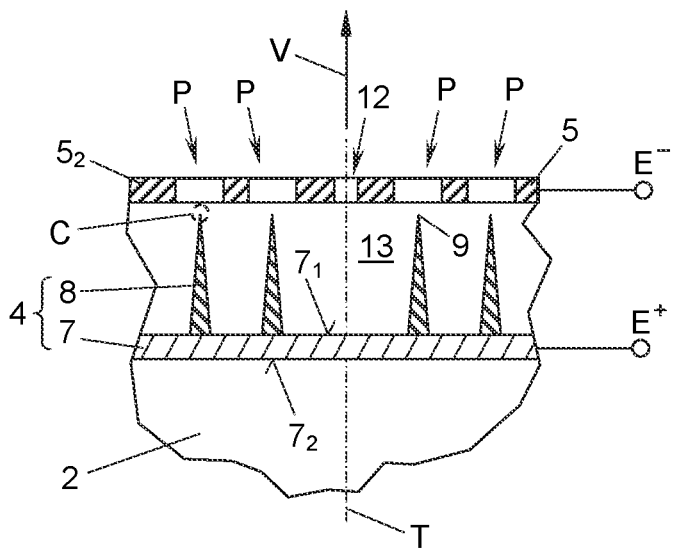
Figure 2C:
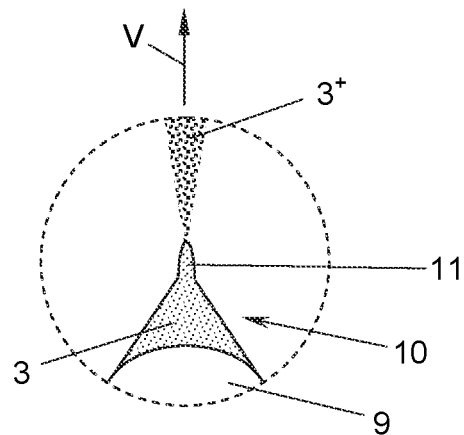

Both examples, the one of FIGS. 1a and 1b and the one of FIGS. 2a to 2c, show an ion thruster 1 for propulsion of a spacecraft, particularly a satellite. The ion thruster 1 comprises a reservoir 2 for a propellant 3 (FIG. 2c). The ion thruster 1 further comprises an emitter 4 for emitting ions $3^+$ of the propellant 3 and an extractor 5 for extracting and accelerating the ions $3^+$ from the emitter 4. The extractor 5 is, therefore, permeable to the propellant 3, e.g., by means of apertures P.

The depicted ion thruster 1 is of field-emission electric propulsion (FEEP) type. Ion thrusters 1 of this type use liquid metal as propellant 3, e.g. caesium, indium, gallium or mercury, which is heated above the liquefaction temperature in the reservoir 2, fed from the reservoir 2 towards the emitter 4 and ionized by field-emission as will be explained in greater detail below. The extractor 5 extracts and accelerates the generated (here: positive) ions $3^+$ of the propellant 3, thereby generating thrust for propulsion of the spacecraft. Moreover, the ion thruster 1 also optionally comprises one or more (in the examples of FIGS. 1a and 2a: two and four, respectively) electron sources 6 (also known in the art as "neutralizers") to the sides of the emitter 4 for balancing a charging of the ion thruster 1 and thus of the spacecraft due to emission of positively charged ions $3^+$.

Alternatively, the ion thruster 1 may be of colloid type using ionic liquid, e.g. room temperature molten salts, as propellant 3. In this case, the electron sources 6 may not be necessary, as colloid thrusters usually change polarity periodically so that a continued self-charging of the ion thruster 1 and the spacecraft does not occur. In a further alternative, the ion thruster 1 can use gas, e.g. xenon, as propellant 3, which is again ionized by extracting electrons from the atoms.

The emitter 4 has a base 7 and one or more outlets for propellant 3 on one side $7_1$ of the base 7 of the emitter 4, said one side $7_1$ being faced by the extractor 5. In the present example the outlets are projections 8 projecting from the side $7_1$. Alternatively, the outlets could just be channels such as bores or capillary channels in the base 7 opening to said one side $7_1$. Therefore, all said for projections in the following applies to outlets in the form of channels in the base as well.

As will be explicated in greater detail with reference to FIG. 2c below, the ions $3^+$ are emitted from said projections 8 of the emitter 4. For this purpose, each projection 8 has the shape of a cone, a pyramid, a triangular prism, or the like and has a sharp tip 9 or edge, respectively, opposite the base 7. In the present examples, each projection 8 is needle-shaped, i.e. a narrow, pointed cone.

Moreover, the base 7 is connected to the reservoir 2 for providing passive flow of propellant 3 from the reservoir 2 to the projections 8. Alternatively, the flow could be an active flow by pressurizing the propellant 3 in the reservoir 2.

In the present examples, the base 7 is made of porous material which is wettable by the propellant, thereby providing passive flow of the propellant 3 by means of capillary forces, i.e., by a combination of surface tension, (pore) geometry and wettability of the respective surface, through the base 7 to the projections 8. Therefore, the base 7 has another side $7_2$ which is, e.g., opposite to said one side $7_1$ and is connected to the reservoir 2 (FIG. 2b). In an alternative embodiment, the base 7 may be impermeable by the propellant 3 except for channels (not shown) providing flow of propellant 3 from said other side $7_2$ to the projections 8. In yet another embodiment, the flow of propellant 3 can be provided on a surface of the base 7, which is wettable by the propellant 3; in this case, the base 7 can be connected to the reservoir 2, e.g., on a lateral side.

For providing flow of the propellant 3 from the thusly porous, channeled and/or wettable base 7 to the tip 9 of the projection 8, each projection 8 is either made of porous material or has a central channel utilizing said capillary forces, or the projection 8 has a surface wettable by the propellant 3 for providing flow of the propellant 3 on the surface. In one optional embodiment, the emitter 4, i.e., both the base 7 and the projections 8, is made of porous material which is wetting in respect to the propellant 3.

Between the projection 8 of the emitter 4 and the extractor 5, a strong electric field in the range from several hundred to several thousand Volt is applied by means of electrodes $E^+$, $E^-$, one of which is connected to the emitter 4, the other one to the extractor 5. By applying the electric field, the propellant 3 forms a so-called Taylor cone 10 on the tip 9 of the projection 8 (FIG. 2c). In the strong electric field on top of the Tailor cone 10, one or more electrons tunnel back to the surface of the projection 8 due to field-emission in FEEP-type ion thrusters 1, changing the formerly neutral atom to a positively charged ion $3^+$. In case of colloid ion thrusters 1 with ionic propellant 3, this ionization is not necessary.

As shown in FIG. 2c, a further consequence of the strong electric field is that a jet 11 is formed on the apex of the Tailor cone 10, from which the ions $3^+$ of the propellant 3 are extracted and then accelerated by the extractor 5 generating thrust. New propellant 3 is replenished by the aforementioned passive or active forces from downstream. Due to the precision at which the voltage between the needle 3 and the extraction electrode $E^-$ can be controlled, the strength of the generated thrust can be controlled with high accuracy.

Generally, the thrust provided by the ion thruster 1, symbolized by a thrust vector V, is parallel to an axis T which orthogonally runs through said one side $7_1$ of the base 7 where the projections 8 face the extractor 5, when the arrangement is perfectly symmetrical around that axis T. Strictly speaking, while each individual ion beam exiting from a projection 8 of the emitter 4 is slightly bent outward towards the extractor 5, the summed thrust vector V of all ion beams is parallel to the axis T in a perfect arrangement. However, due to irregularities in the nature and composition of ion thrusters 1 the summed thrust vector V of the ions $3^+$ extracted from the emitter 4 may vary temporally and/or deviate permanently from the intended direction. In order to compensate for such unintended irregularities and/or to intentionally deflect the thrust vector V from said axis T, i.e. for "thrust vectoring", the extractor 5 is split into sectors $5_1$, $5_2$, ..., generally $5_i$, about the axis T. Said sectors $5_i$ are electrically insulated from one another, e.g., by an insulating material or simply by gaps 12 between neighboring sectors $5_i$. Thereby, each sector $5_i$ can be separately voltage-supplied and electric fields of individual strength can be applied.

Each sector $5_i$ is allocated to (here: by being close to) at least one projection 8 as shown. Consequently, those sectors $5_i$ of the extractor 5, where a stronger electrical field is applied, will extract and accelerate more ions $3^+$ from the projections 8 allocated thereto than others; thus, the resulting thrust vector V' is deflected, e.g., by an angle δ, to or from said axis T, e.g., to or from the original thrust vector V.

The emitter 4 shown in the example of FIGS. 1a and 1b has a multitude of needle-shaped projections 8 which are arranged symmetrically about the axis T in a single circle (FIG. 1a) on said one side $7_1$ of the base 7. Also the base 7 is ring-shaped such that a crown-shaped emitter 4 is formed. Moreover, the extractor 5 has a single aperture P for emission of the ions $3^+$ of the propellant 3 from all projection 8 of the crown-shaped emitter 4. Thereby, a common acceleration chamber 13 for the ions $3^+$ is formed between the emitter 4 and the extractor 5.

The extractor 5 of this example is split into three (here: ring-)sectors $5_i$ about the axis T. Each sector $5_i$ is allocated to the respectively closest projections 8. The sectors $5_i$ can either be symmetrical, i.e. each sector $5_i$ spanning the same angle α about the axis T (as in the example of FIG. 1a) or differ from each other, i.e., each or some of the sectors $5_i$ span a different angle α.

As shown in the example of FIGS. 1a and 1b, said other side $7_2$ of the base 7 which is connected to the reservoir 2 can optionally be a lateral side of the base 7 of the (here: crown-shaped) emitter 4.

In the example of FIGS. 2a and 2b, the shape of the emitter 4 and the extractor 5 as well as the arrangement of the projections 8 are different: The projections 8 are arranged on the base 7 in straight rows and columns. Hence, the projections 8 in this example are symmetric about the axis T. Specifically, the projections 8 could be arranged in a circular symmetry about the axis T (not shown). However, a symmetry is not necessary. All sectors $5_i$ of the extractor 5 optionally span the same angle α about the axis T, as explained above with respect to the example of FIG. 1a.

Furthermore, the extractor 5 in the example of FIGS. 2a and 2b has a separate aperture P for each projection 8 which aperture P is penetrated by the ions $3^+$ extracted and accelerated from this projection 8. Nevertheless, a common acceleration chamber 13 for the ions $3^+$ without intermediate walls or segmenting is formed by the emitter 4 and the extractor 5. The extractor 5 in this example is split orthogonally into four equal sectors $5_i$ each of which being allocated to the same number of (here: nine) projections 8.

It is, however, understood that the extractors 5 in the examples of FIGS. 1a and 2a (and in any other embodiment) can alternatively be split into two or more than three or four sectors $5_i$, respectively, and/or the sectors $5_i$ of the extractors 5 could optionally be allocated to different numbers of projections 8, e.g., by spanning different angles α.

The disclosed subject matter is not restricted to these specific embodiments described in detail herein but encompasses all variants, combinations, and modifications thereof that fall within the frame of the appended claims.

What is claimed is:

1. An ion thruster for thrust vectored propulsion of a spacecraft, comprising:
   a reservoir for a propellant,
   an emitter having a base and, on one side of the base, one or more outlets for emitting ions of the propellant, wherein the base is connected to the reservoir for providing flow of propellant from the reservoir to the one or more outlets, and
   an extractor facing said one side of the emitter for extracting and accelerating the ions from the emitter, wherein the emitter and the extractor form a common acceleration chamber containing all outlets of the emitter,
   wherein the extractor has a single aperture for the passage of the ions emitted from all outlets of the emitter, wherein the aperture of the extractor is symmetrical about an axis which orthogonally runs through said one side of the emitter, and wherein the extractor is split into sectors in circumferential direction around the axis, said sectors being electrically insulated from one another.

2. The ion thruster according to claim 1, wherein the extractor is split into three sectors.

3. The ion thruster according to claim 1, wherein the emitter is made of a porous material which is wetting in respect to the propellant.

4. The ion thruster according to claim 1, wherein two or more outlets are arranged in a circular symmetry about said axis and all sectors span an equal angle about said axis.

5. The ion thruster according to claim 4, wherein the emitter has a plurality of outlets arranged in a single circle on the base about said axis.

6. The ion thruster according to claim 1, wherein each of said one or more outlets is a projection on said one side of the base.

7. The ion thruster according to claim 6, wherein the projection is needle-shaped.

8. An ion thruster for thrust vectored propulsion of a spacecraft, comprising:
  a reservoir for a propellant,
  an emitter having a base and, on one side of the base, two or more outlets for emitting ions of the propellant, wherein the base is connected to the reservoir for providing flow of propellant from the reservoir to the two or more outlets, and
  an extractor facing said one side of the emitter for extracting and accelerating the ions from the emitter, wherein the emitter and the extractor form a common acceleration chamber containing all outlets of the emitter,
  wherein the extractor has a separate aperture for each outlet of the emitter for the passage of the ions emitted from each said outlet and wherein the extractor is split into sectors about an axis which orthogonally runs through said one side of the emitter, said sectors being electrically insulated from one another and each sector being allocated to one or more of the outlets.

9. The ion thruster according to claim 8, wherein the extractor is split symmetrically about the axis.

10. The ion thruster according to claim 8, wherein the emitter is made of a porous material which is wetting in respect to the propellant.

11. The ion thruster according to claim 8, wherein the emitter has a plurality of outlets arranged on the base in straight rows and columns or in a circular symmetry about said axis.

12. The ion thruster according to claim 11, wherein the extractor is split into four equal sectors, each of which being allocated to the same number of outlets.

13. The ion thruster according to claim 8, wherein each of said two or more outlets is a projection on said one side of the base.

14. The ion thruster according to claim 13, wherein the projection is needle-shaped.

\* \* \* \* \*